US012695026B2

(12) United States Patent
Shindo et al.

(10) Patent No.: US 12,695,026 B2
(45) Date of Patent: Jul. 28, 2026

(54) CONTROL DEVICE FOR POWER CONVERSION DEVICE

(71) Applicant: HONDA MOTOR CO., LTD., Tokyo (JP)

(72) Inventors: Yusuke Shindo, Saitama (JP); Ryota Kitamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 697 days.

(21) Appl. No.: 18/199,621

(22) Filed: May 19, 2023

(65) Prior Publication Data

US 2023/0395316 A1 Dec. 7, 2023

(30) Foreign Application Priority Data

Jun. 3, 2022 (JP) ................................ 2022-091016

(51) Int. Cl.
*H01F 27/38* (2006.01)
*H01F 3/14* (2006.01)
*H01F 27/26* (2006.01)

(52) U.S. Cl.
CPC ............... *H01F 27/38* (2013.01); *H01F 3/14* (2013.01); *H01F 27/263* (2013.01)

(58) Field of Classification Search
CPC ........... H01F 27/38; H01F 3/14; H01F 27/263
See application file for complete search history.

(56) References Cited

U.S. PATENT DOCUMENTS

2017/0244338 A1* 8/2017 Kitamoto .............. H02M 7/539
2018/0350513 A1* 12/2018 Murakami .............. H01F 37/00
2023/0215614 A1* 7/2023 Chen ......................... H01F 3/14 336/12

FOREIGN PATENT DOCUMENTS

CN 106057433 A * 10/2016 ........... H01F 27/306
EP 1014397 A1 * 6/2000 ............. H01F 38/08
JP 2011205806 A * 10/2011
JP 2017-153240 A 8/2017
WO WO-2011061984 A1 * 5/2011 ............. H01F 37/00
WO WO-2020031972 A1 * 2/2020 ............. H01F 27/24

* cited by examiner

*Primary Examiner* — Malcolm Barnes
(74) *Attorney, Agent, or Firm* — Paratus Law Group, PLLC

(57) ABSTRACT

An inner core portion includes an inner gap having a length in the first direction larger than that of the outer gap in a center in the first direction. A control device is configured to switch between a one-phase operation of causing a current to flow through any one of the first outer coil, the second outer coil, and the inner coil to operate, a two-phase operation of causing a current to flow through any two of the first outer coil, the second outer coil, and the inner coil to operate, and a three-phase operation of causing a current to flow through all of the first outer coil, the second outer coil, and the inner coil to operate. The control device selects the inner coil in the one-phase operation.

2 Claims, 9 Drawing Sheets

$$t_i = \frac{l_o - l_i}{\mu_r} + t_o$$

CURRENT DEPENDENCE OF RIPPLE DURING THREE-PHASE OPERATION

CONTROL DEVICE FOR POWER CONVERSION DEVICE

CROSS-REFERENCE TO RELATED APPLICATIONS

This application is based on and claims priority under 35 USC 119 from Japanese Patent Application No. 2022-091016 filed on Jun. 3, 2022.

TECHNICAL FIELD

The present disclosure relates to a control device for a power conversion device.

BACKGROUND ART

In recent years, researches and developments have been conducted that contribute to an increase in energy efficiency in order to allow more people to access affordable, reliable, sustainable, and advanced energy.

A reactor configured by attaching a coil around a core is used in a DC-DC converter mounted on an electrical vehicle, a hybrid electrical vehicle (HEV), or the like. In recent years, a multi-phase converter aiming at high efficiency is used in a large-output converter by providing a plurality of driving phases and dividing a current. In such a multi-phase converter, it is known that loss changes depending on the number of phases to be operated, and a control method for reducing the number of operating phases in order to reduce switching loss during small output is common.

For example, in JP2017-153240A, it is proposed to create a loss map centered on a current and operate at the number of phases having the highest efficiency.

The DC-DC converter disclosed in JP2017-153240A uses a four-phase reactor using two magnetic coupling reactors in each of which a two-phase core is integrated, and is not a three-phase magnetic coupling reactor in which a three-phase core is integrated. In the three-phase magnetic coupling reactor, it is also desirable to reduce the number of operating phases in order to reduce switching loss at the time of a low current.

When a one-phase operation is performed in the three-phase magnetic coupling reactor, there is room for study on which phase can be selected to reduce loss.

SUMMARY

The present disclosure provides a control device for a power conversion device which uses a three-phase magnetic coupling reactor which can reduce loss during a one-phase operation.

According to an aspect of the present disclosure, there is provided a control device for a power conversion device which uses a three-phase magnetic coupling reactor, in which: the three-phase magnetic coupling reactor includes: a first outer coil; a second outer coil; an inner coil disposed between the first outer coil and the second outer coil; and a core including a first outer core portion around which the first outer coil is wound, a second outer core portion around which the second outer coil is wound, and an inner core portion around which the inner coil is wound; the first outer core portion, the second outer core portion, and the inner core portion extend in a first direction, and are disposed side by side in a second direction orthogonal to the first direction; one end sides of the first outer core portion, the second outer core portion, and the inner core portion in the first direction are coupled by a first coupling portion which extends in the second direction; an other end sides of the first outer core portion, the second outer core portion, and the inner core portion in the first direction are coupled by a second coupling portion which extends in the second direction; magnetic fluxes which pass through the first outer core portion, the second outer core portion, and the inner core portion are configured such that a direction of a direct-current magnetic flux derived from a coil wound around any core portion and generated in the core portion and a direction of a direct-current magnetic flux derived from another coil wound around another core portion and generated in the core portion are opposite to each other; each of the first outer core portion and the second outer core portion includes an outer gap in a center in the first direction; the inner core portion includes an inner gap having a length in the first direction larger than that of the outer gap in a center in the first direction; the control device is configured to switch between: a one-phase operation of causing a current to flow through any one of the first outer coil, the second outer coil, and the inner coil to operate; a two-phase operation of causing a current to flow through any two of the first outer coil, the second outer coil, and the inner coil to operate; and a three-phase operation of causing a current to flow through all of the first outer coil, the second outer coil, and the inner coil to operate; and the control device selects the inner coil in the one-phase operation.

According to the present disclosure, it is possible to reduce loss during a one-phase operation in a power conversion device which uses a three-phase magnetic coupling reactor.

DESCRIPTION OF EMBODIMENTS

Hereinafter, a control device for a power conversion device according to an embodiment of the present disclosure will be described with reference to drawings.

Figure 1:
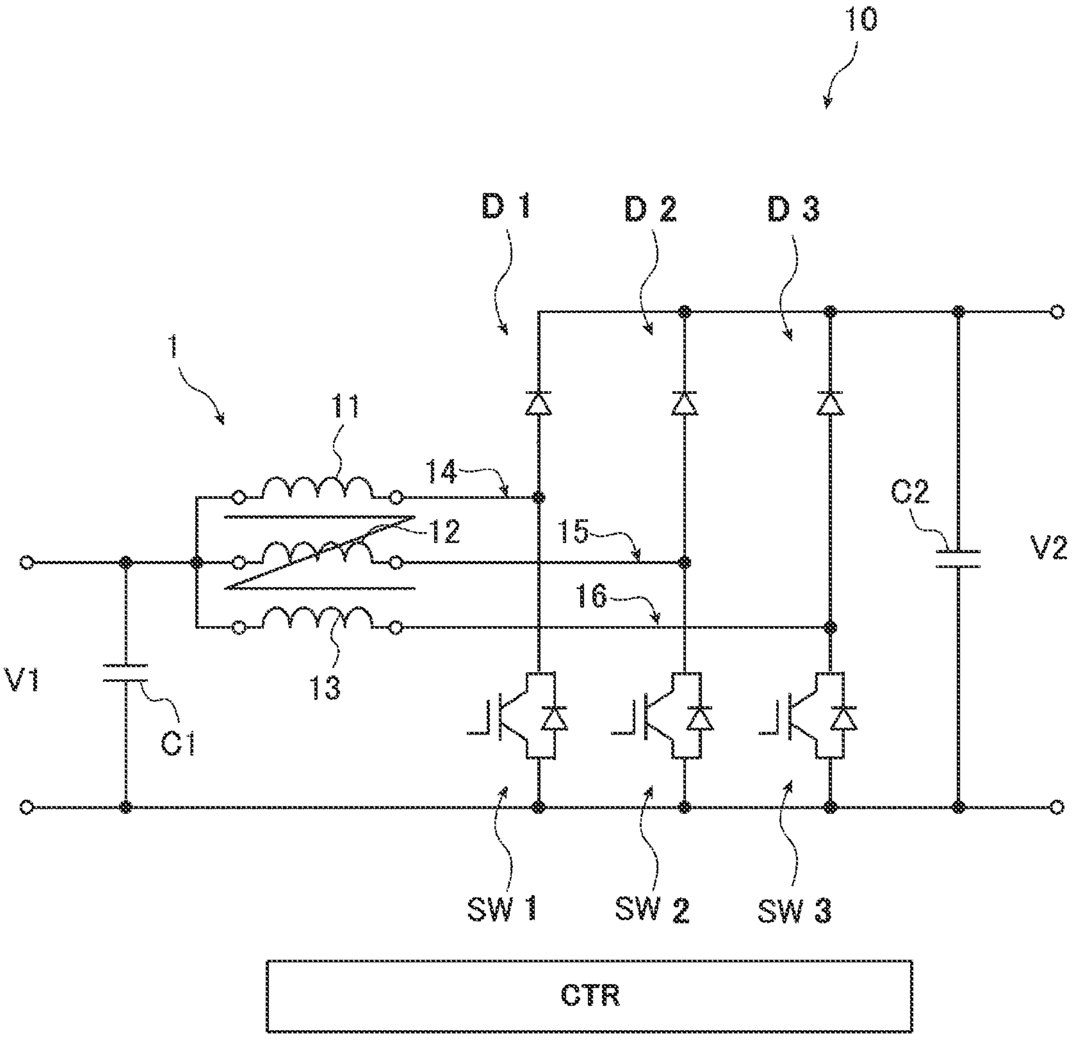
FIG. 1 is a circuit diagram of a three-phase interleaved DC-DC converter 10.

First, a three-phase interleaved DC-DC converter as an example of the power conversion device which is a control target of the control device of the present disclosure will be described. FIG. 1 is a circuit diagram illustrating the three-phase interleaved DC-DC converter.

The three-phase interleaved DC-DC converter 10 (hereinafter, referred to as a DC-DC converter 10) illustrated in FIG. 1 includes a smoothing capacitor C1, a three-phase magnetic coupling reactor 1 (hereinafter, referred to as a three-phase reactor) including three coils 11 to 13, switch units SW1, SW2, and SW3, diodes D1, D2, and D3, a smoothing capacitor C2, and a control device CTR.

When the DC-DC converter 10 operates using a voltage V1 on a smoothing capacitor C1 side as an input voltage and using a voltage V2 on a smoothing capacitor C2 side as an output voltage, the DC-DC converter 10 boosts the input voltage V1.

In the three-phase reactor 1, input terminals of the coils 11 to 13 are connected in parallel to a high-potential-side power supply line. An output terminal of the coil 11 of the three-phase reactor 1 is connected to an intermediate node between the switch unit SW1 and the diode D1 connected in series, and constitutes a first voltage conversion unit 14. An output terminal of the coil 12 of the three-phase reactor 1 is connected to an intermediate node between the switch unit SW2 and the diode D2 connected in series, and constitutes a second voltage conversion unit 15. An output terminal of the coil 13 of the three-phase reactor 1 is connected to an intermediate node between the switch unit SW3 and the diode D3 connected in series, and constitutes a third voltage conversion unit 16. The switch units SW1, SW2, and SW3 each include a switching element such as an insulated gate bipolar transistor (IGBT) and a reflux diode connected in parallel to the switching element.

"Three-phase" in the three-phase reactor 1 means that the number of conversion units is three. A one-phase operation described later means that the number of conversion units which perform a switching operation among the first voltage conversion unit 14 to the third voltage conversion unit 16 is one. A two-phase operation described later means that the number of the conversion units which perform the switching operation is two. A three-phase operation described later means that the number of the conversion units which perform the switching operation is three. In the following description, the first voltage conversion unit 14 may be referred to as "phase one", the second voltage conversion unit 15 may be referred to as "phase two", and the third voltage conversion unit 16 may be referred to as "phase three".

The switching elements of the switch units SW1 to SW3 are controlled to be turned on or off by a signal from the control device CTR. The three voltage conversion units 14, 15, and 16 of the DC-DC converter 10 are electrically connected in parallel to one another, and perform an on/off switching operation on the switching element of at least one of the voltage conversion units 14, 15, and 16 at a desirable timing, so that the voltage V1 is boosted while maintaining a direct current, and the voltage V2 is output. On/off switching operations of the switch units SW1, SW2, and SW3 of the voltage conversion units 14, 15, and 16 are controlled by a pulse-shaped switching signal having a predetermined duty ratio from the switching control unit to the DC-DC converter 10.

When on/off switching control is performed on the switching elements of the voltage conversion units 14, 15, and 16, during an on operation, an input current to the DC-DC converter 10 flows to a switching element side and the three-phase reactor 1 stores energy, and during an off operation, the input current to the DC-DC converter 10 flows to a diode side and the three-phase reactor 1 releases the stored energy. In a case of the one-phase operation in which only one of the three voltage conversion units 14, 15, and 16 of the DC-DC converter 10 is driven, a current which flows through one voltage conversion unit of the DC-DC converter 10 during the off operation is output. Further, in a case of the two-phase operation in which two of the three voltage conversion units 14, 15, and 16 of the DC-DC converter 10 are driven, for example, interleave control is performed in which on/off switching phases of the voltage conversion units 14, 15, and 16 to be driven are shifted by 180 degrees. In a case of the three-phase operation in which all of the three voltage conversion units 14, 15, and 16 of the DC-DC converter 10 are driven, for example, interleave control is performed in which the on/off switching phases of the voltage conversion units 14, and 16 are shifted by 120 degrees.

Next, a structure of the three-phase reactor 1 will be described. In the following description, among the three coils 11 to 13, the coils 11 and 13 disposed on an outer side are respectively referred to as the first outer coil 11 and the second outer coil 13, and the coil 12 sandwiched between the first outer coil 11 and the second outer coil 13 is referred to as the inner coil 12. Further, as illustrated in FIGS. 2 and 3, a positional relationship of parts of the three-phase reactor 1 will be described using an orthogonal coordinate system including an X axis, a Y axis, and a Z axis.

Figure 2:
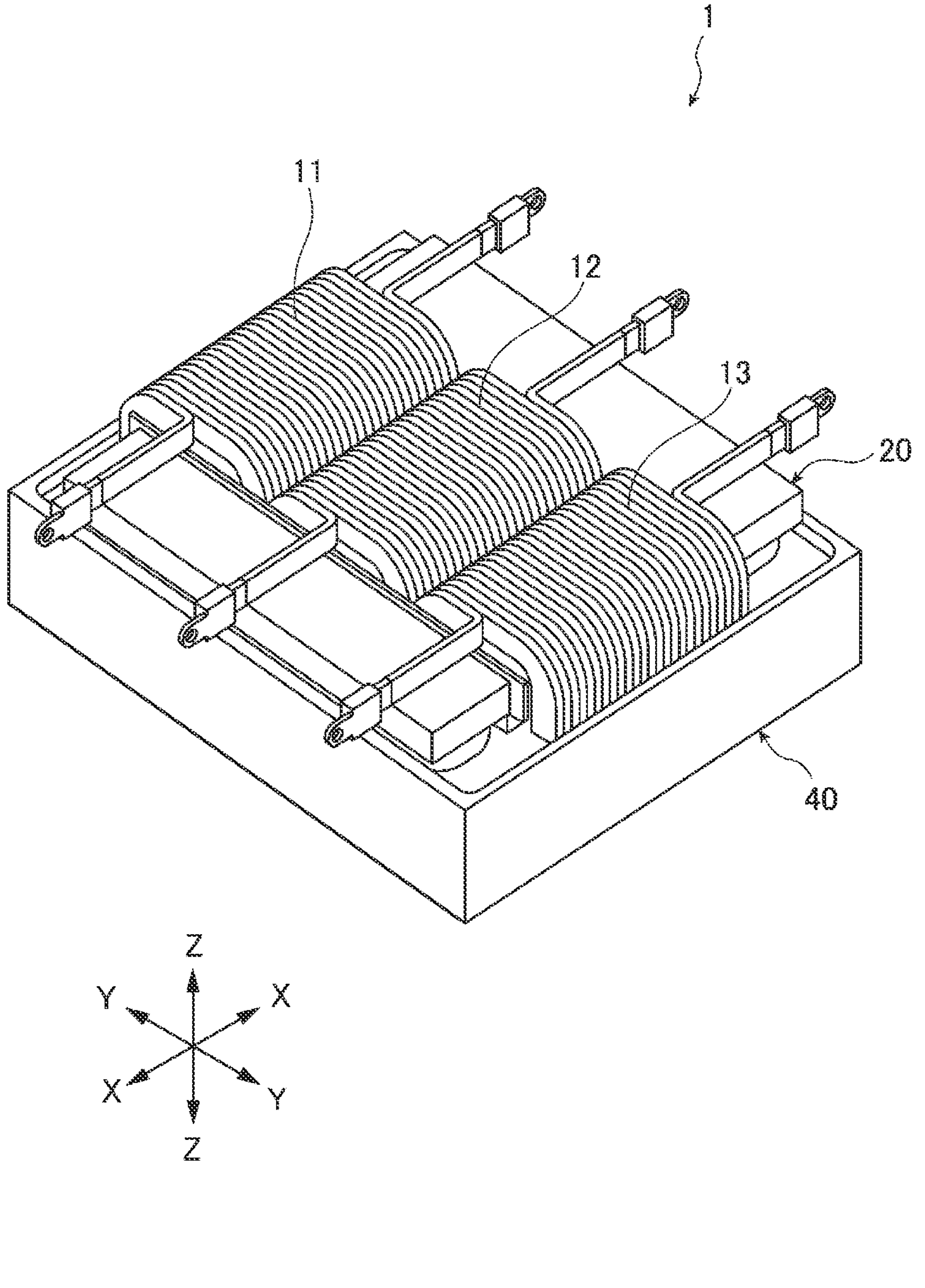
FIG. 2 is a perspective view of a three-phase magnetic coupling reactor 1 used in the DC-DC converter 10.
Figure 3:
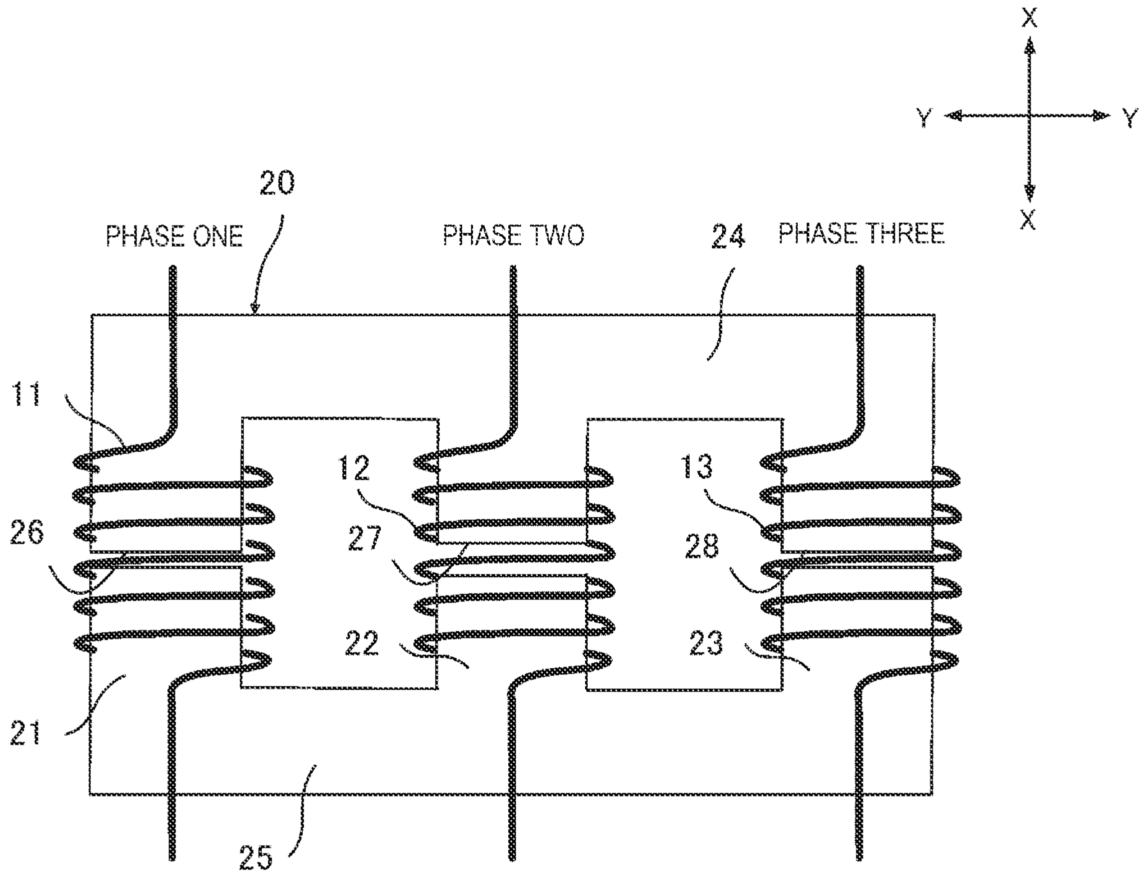
FIG. 3 is a plan view of the three-phase magnetic coupling reactor 1.

As illustrated in FIG. 2, the three-phase reactor 1 includes the first outer coil 11, the second outer coil 13, the inner coil 12, a core 20, and a housing 40 which houses the first outer coil 11, the second outer coil 13, the inner coil 12, and the core 20.

The core 20 is implemented by, for example, a powder magnetic core obtained by molding powder of a soft magnetic material. As illustrated in FIG. 3, the core 20 includes a first outer core portion 21, an inner core portion 22, and a second outer core portion 23 which extend in an X-axis direction, and which are disposed side by side in parallel to one another along a Y-axis direction, a first coupling portion 24 which extends in the Y-axis direction on one end side in the X-axis direction, and which couples the first outer core portion 21, the inner core portion 22, and the second outer core portion 23 to one another, and a second coupling portion 25 which extends in the Y-axis direction on the other end side in the X-axis direction, and which couples the first outer core portion 21, the inner core portion 22, and the second outer core portion 23 to one another. In other words, the core 20 is a core which is disposed on an XY plane formed along the X-axis direction and the Y-axis direction and which has a planar structure. The X-axis direction is a first direction of the present disclosure, and the Y-axis direction is a second direction of the present disclosure.

The first outer core portion 21 and the second outer core portion 23 respectively have gaps 26 and 28 (hereinafter, referred to as outer gaps 26 and 28) in centers in the X direction. Further, the inner core portion 22 has a gap 27 (hereinafter, referred to as an inner gap 27) in a center in the X direction. The gaps 26 to 28 are provided to adjust magnetic resistances of the phases, but details thereof will be described later.

The first outer coil 11 is wound around the first outer core portion 21, the second outer coil 13 is wound around the second outer core portion 23, and the inner coil 12 is wound around the inner core portion 22. Therefore, the first outer core portion 21, the inner core portion 22, and the second outer core portion 23 extend in the X-axis direction, and are disposed side by side in the Y-axis direction. The number of turns of each of the coils 11 to 13 is equal, and a winding direction of each of the coils 11 to 13 is the same.

In the three-phase reactor 1, when a current is caused to flow through any two or more of the coils 11, 12, and 13, a direction of a magnetic flux (hereinafter, referred to as a magnetic flux direction) generated in each coil is opposite to one another in any combination, and the magnetic fluxes generated in the core can be reduced. That is, the magnetic fluxes which pass through the first outer core portion 21, the second outer core portion 23, and the inner core portion 22 are configured such that a direction of a direct-current magnetic flux derived from a coil wound around any core portion and generated in the core portion and a direction of a direct-current magnetic flux derived from another coil wound around another core portion and generated in the core portion are opposite to each other. Accordingly, magnetic saturation of the core 20 can be prevented, and larger inductance can be generated.

The flow of the magnetic flux will be described in more detail with reference to FIGS. 4 and 5 by taking the two-phase operation as an example.

Figure 4:
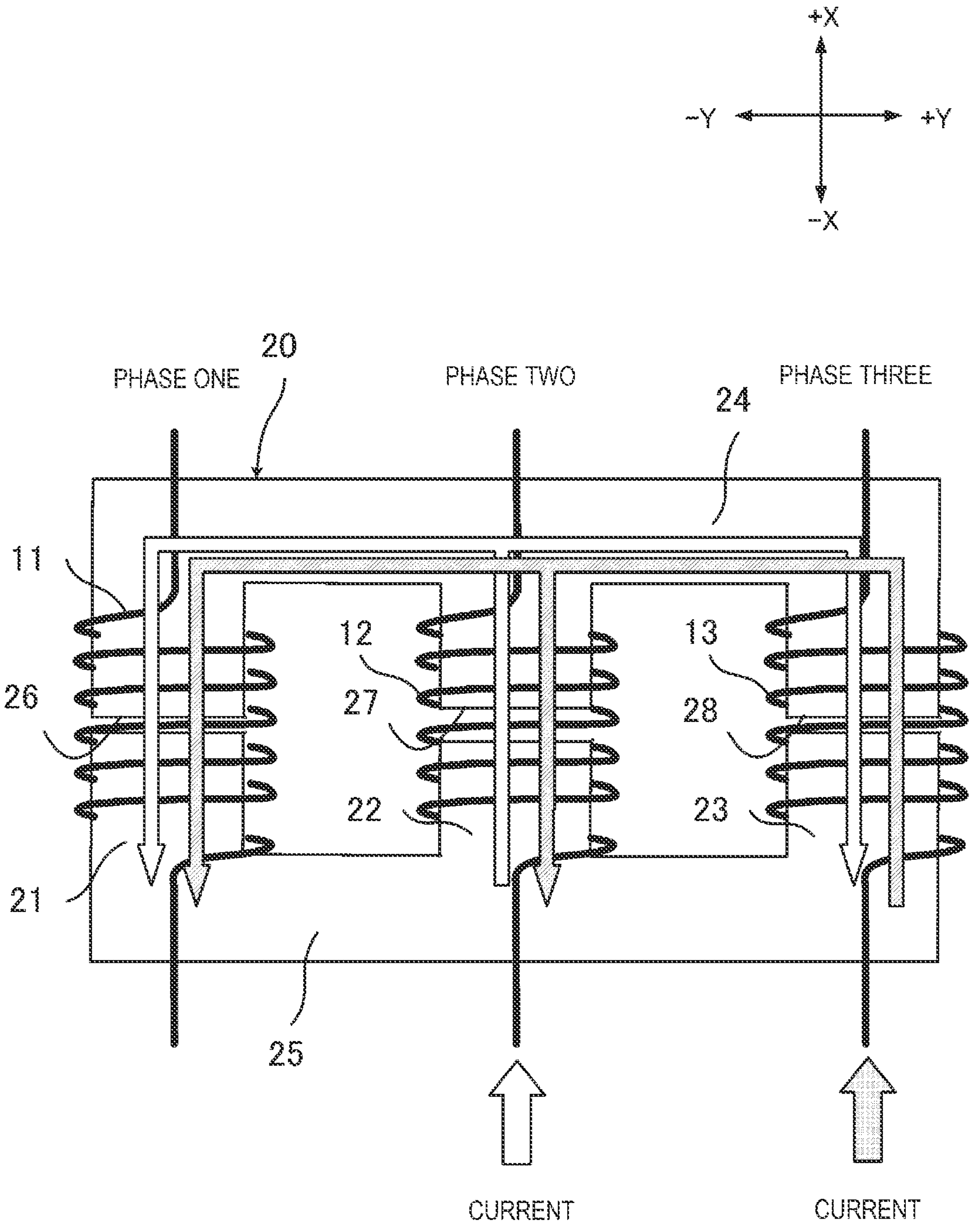
FIG. 4 is a diagram illustrating directions of magnetic fluxes of core portions during a two-phase operation of a phase two and a phase three.

FIG. 4 is a diagram illustrating directions of magnetic fluxes of the core portions during the two-phase operation in the phase two and the phase three. FIG. 5 is a diagram illustrating directions of magnetic fluxes of the core portions during the two-phase operation in the phase one and the phase three. In the following description, as illustrated in FIGS. 4 and 5, an upward direction of a drawing sheet in the X direction is described as a +X direction, a downward direction of the drawing sheet in the X direction is described as a −X direction, a rightward direction of the drawing sheet in a Y direction is described as a +Y direction, and a leftward direction of the drawing sheet in the Y direction is described as a −Y direction.

As illustrated in FIG. 4, when the phase two and the phase three are selected in the two-phase operation, magnetic fluxes (white arrows in the drawing) generated in the core 20 by a current which flows through the inner coil 12 (phase two) are generated in a positive direction (from the −X direction to the +X direction in the drawing) in the inner core portion 22, and are generated in an opposite direction (from the +X direction to the −X direction in the drawing) in the first outer core portion 21 and the second outer core portion 23.

On the contrary, magnetic fluxes (hatched arrows in the drawing) generated in the core 20 by a current which flows through the second outer coil 13 (phase three) are generated in the positive direction (from the −X direction to the +X direction in the drawing) in the second outer core portion 23, and are generated in the opposite direction (from the +X direction to the −X direction in the drawing) in the inner core portion 22 and the first outer core portion 21.

That is, as can be seen from the arrows in FIG. 4 schematically illustrating the directions of the magnetic fluxes, when the directions of the currents which flow through the inner coil 12 (phase two) and the second outer coil 13 (phase three) are the same, the direction of the direct-current magnetic flux derived from the inner coil 12 (phase two) and generated in the inner core portion 22 and the direction of the direct-current magnetic flux derived from the second outer coil 13 (phase three) and generated in the inner core portion 22 are opposite to each other. Further, the direction of the direct-current magnetic flux derived from the second outer coil 13 (phase three) and generated in the second outer core portion 23 and the direction of the direct-current magnetic flux derived from the inner coil 12 (phase two) and generated in the second outer core portion 23 are opposite to each other.

Figure 5:
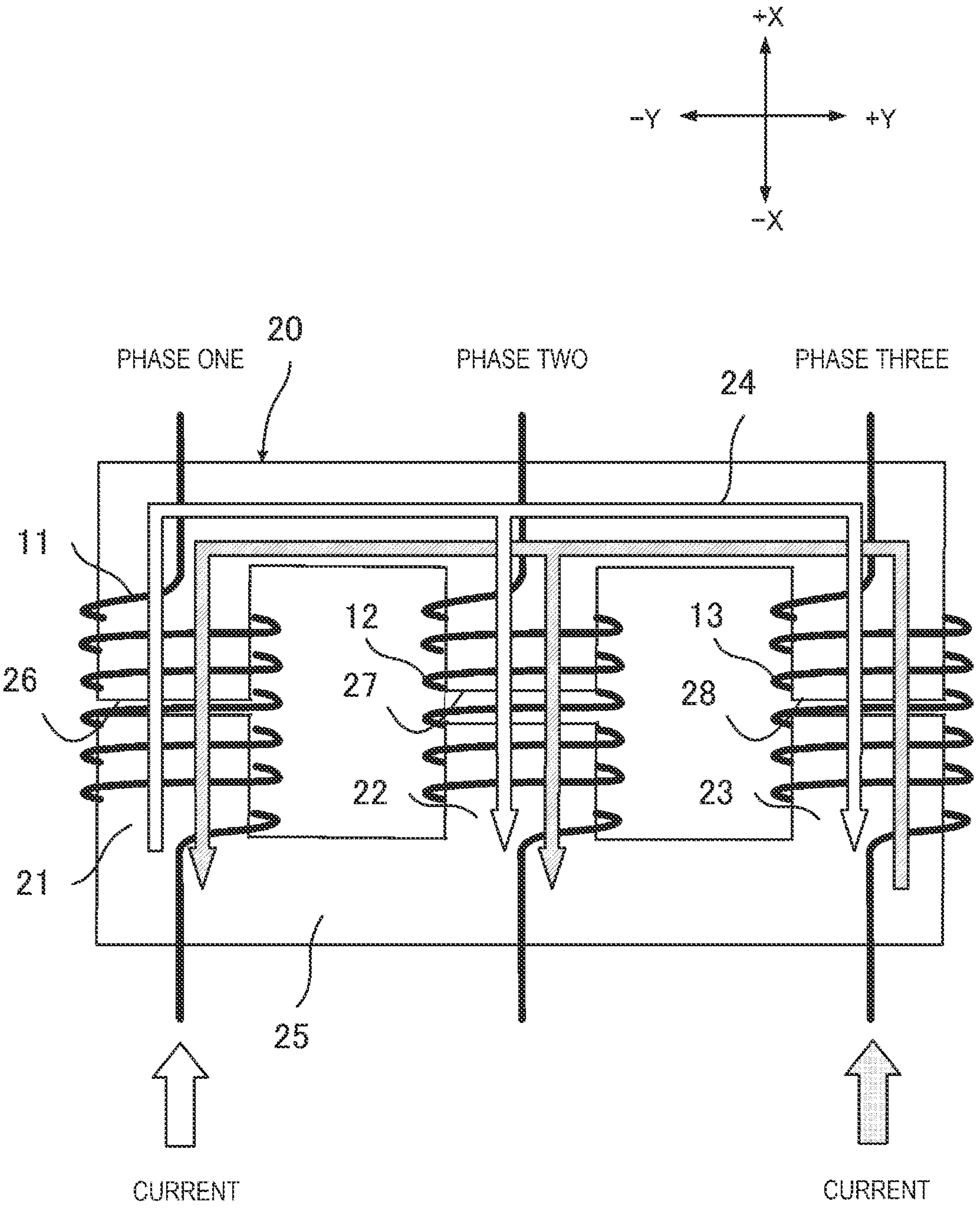
FIG. 5 is a diagram illustrating directions of magnetic fluxes of the core portions during a two-phase operation of a phase one and the phase three.

As illustrated in FIG. 5, when the phase one and the phase three are selected in the two-phase operation, the magnetic fluxes (white arrows in the drawing) generated in the core by a current which flows through the first outer coil 11 (phase one) are generated in the positive direction (from the −X direction to the +X direction in the drawing) in the first outer core portion 21, and are generated in the opposite direction (from the +X direction to the −X direction in the drawing) in the inner core portion 22 and the second outer core portion 23.

On the contrary, magnetic fluxes (hatched arrows in the drawing) generated in the core 20 by a current which flows through the second outer coil 13 (phase three) are generated in the positive direction (from the −X direction to the +X direction in the drawing) in the second outer core portion 23, and are generated in the opposite direction (from the +X direction to the −X direction in the drawing) in the inner core portion 22 and the first outer core portion 21.

That is, as can be seen from the arrows in FIG. 5 schematically illustrating the directions of the magnetic fluxes, when the directions of the currents which flow through the first outer coil 11 (phase one) and the second outer coil 13 (phase three) are the same, the direction of the direct-current magnetic flux derived from the first outer coil 11 (phase one) and generated in the first outer core portion 21 and the direction of the direct-current magnetic flux derived from the second outer coil 13 (phase three) and generated in the first outer core portion 21 are opposite to each other. Further, the direction of the direct-current magnetic flux derived from the second outer coil 13 (phase three) and generated in the second outer core portion 23 and the direction of the direct-current magnetic flux derived from the first outer coil 11 (phase one) and generated in the second outer core portion 23 are opposite to each other. Although detailed description is omitted, this also applies to a case where the phase one and the phase two are selected in the two-phase operation, and the same applies to the three-phase operation.

In the DC-DC converter 10 configured as described above, a ripple of the output current can be reduced by increasing the number of the voltage conversion units 14, 15, and 16 to be driven. Further, switching loss is increased due to an increase in the number of the voltage conversion units 14, 15, and 16 to be driven, but conduction loss is reduced. The control device CTR selects the number of the voltage conversion units 14, 15, and 16 to be driven by using a map or the like indicating energy efficiency of the DC-DC converter 10 in consideration of loss for each number of the voltage conversion units 14, 15, and 16 to be driven. Further, the control device CTR selects a phase to be driven in the one-phase operation and the two-phase operation. The control device CTR selects the voltage conversion unit 15 (phase two), that is, the inner coil 12 during the one-phase operation as will be described later. Further, the control device CTR may select the voltage conversion unit 15 (phase two) and the third voltage conversion unit 16 (phase three), may select the first voltage conversion unit 14 (phase one) and the third voltage conversion unit 16 (phase three), or may select the first voltage conversion unit 14 (phase one) and the voltage conversion unit 15 (phase two) during the two-phase operation as described above. In a case of the three-phase operation, since all the phases of the first voltage conversion unit 14 (phase one) to the third voltage conversion unit 16 (phase three) are operated, there is no room for selecting a phase.

Next, the gaps 26 to 28 provided in the core 20 will be described, and a reason for selecting the voltage conversion unit 15 (phase two), that is, the inner coil 12 during the one-phase operation will be described. Here, the gaps 26 to 28 are designed to be optimum in the three-phase operation.

Figure 6:
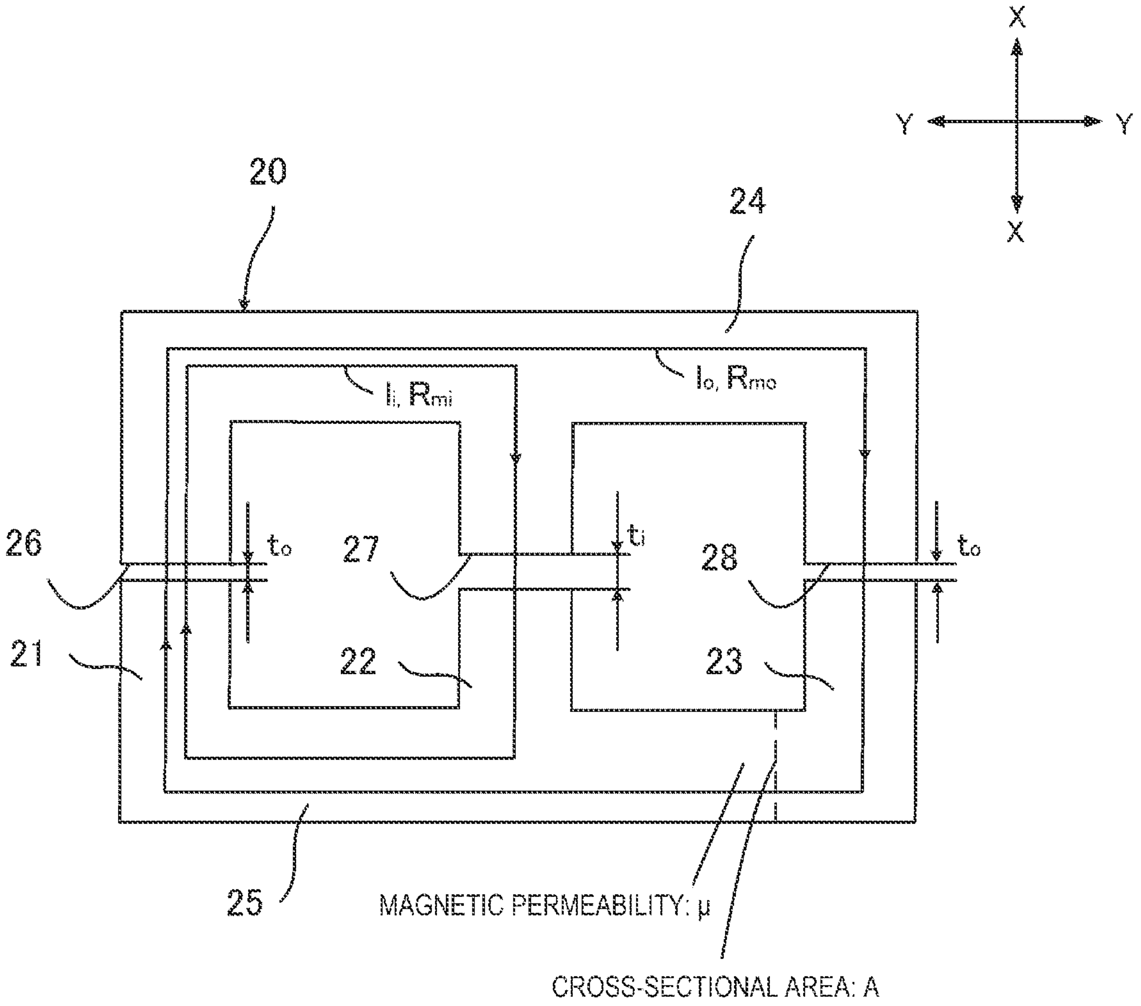
FIG. 6 is a diagram illustrating gaps 26 to 28.

FIG. 6 is a diagram illustrating the gaps 26 to 28.

(Three-Phase Operation)

Parameters of parts of the core 20 are defined as follows.

A magnetic path length which passes through the inner core portion 22 from the outer core portions 21 and 23: $l_i$ A magnetic path length which passes through the outer core portions 21 and 23 from the outer core portions 21 and 23: $l_o$ A magnetic resistance which passes through the inner core portion 22 from the outer core portions 21 and 23: $R_{mi}$ A magnetic resistance which passes through the outer core portions 21 and 23 from the outer core portions 21 and 23: $R_{mo}$ A length of the gap 27 of the inner core portion 22: $t_i$ Lengths of the gaps 26 and 28 of the outer core portions 21 and 23: $t_o$ Vacuum magnetic permeability: $\mu_o$ Absolute magnetic permeability of the core 20: $\mu$ Relative magnetic permeability of the core 20: $\mu_r=\mu_0/\mu$ A cross-sectional area of the core 20: A The number of turns of the coils 11 to 13: N An energizing current of the coils 11 to 13: I The magnetic resistance $R_{mi}$ and the magnetic resistance $R_{mo}$ are expressed by the following Equations (1), respectively.

$$R_{mi} = \frac{l_i}{\mu A} + \frac{t_i + t_o}{\mu_0 A} \qquad (1)$$

$$R_{mo} = \frac{l_o}{\mu A} + \frac{2t_o}{\mu_0 A}.$$

When viewed from the outer core portions 21 and 23, since the magnetic flux is divided into a magnetic path of $l_i$ and a magnetic path of $l_o$, a magnetic flux $\phi_o$ generated from the phase is expressed by the following Equation (2).

$$\Phi_o = NI \cdot \left(\frac{1}{R_{mi}} + \frac{1}{R_{mo}}\right). \qquad (2)$$

When viewed from the inner core portion 22, since the magnetic flux is divided into two magnetic paths of $I_i$, a magnetic flux $\Phi_i$ generated from the phase is expressed by the following Equation (3).

$$\Phi_i = 2NI \cdot \frac{1}{R_{mi}}. \qquad (3)$$

A magnetic flux $\Phi_{o2o}$ which flows from one of the outer core portions 21 and 23 to the other of the outer core portions 21 and 23 is expressed by the following Equation (4).

$$\Phi_{o2o} = NI \cdot \frac{1}{R_{mi}} \qquad (4)$$

A magnetic flux $\Phi_{i2o}$ which flows from the inner core portion 22 to one of the outer core portions 21 and 23 is expressed by the following Equation (5).

$$\Phi_{i2o} = NI \cdot \frac{1}{R_{mi}} \qquad (5)$$

Therefore, as a result of cancellation by the outer core portions 21 and 23, the remaining magnetic flux $\Phi_o$ is expressed by the following Equation (6).

$$\bar{\Phi}_o = NI \cdot \left(-\frac{1}{R_{mi}} + \frac{1}{R_{mo}}\right) \qquad (6)$$

Similarly, as a result of cancellation by the inner core portion 22, the remaining magnetic flux $\Phi_i$ is expressed by the following Equation (7).

$$\bar{\Phi}_i = 2NI \cdot \left(\frac{1}{R_{mi}} - \frac{1}{R_{mo}}\right) \qquad (7)$$

Since effects of magnetic coupling are the greatest when the remaining magnetic flux is 0 as a result of the cancellation by the outer core portions 21 and 23 and the inner core portion 22, the following Equation (8) is established.

$$\frac{1}{R_{mi}} - \frac{1}{R_{mo}} = 0 \qquad (8)$$

$$R_{mi} = R_{mo}.$$

At this time, when the magnetic resistance is expressed by dimensional parameters, the following Equation (9) is obtained.

$$\frac{l_i}{\mu A} + \frac{t_i + t_o}{\mu_0 A} = \frac{l_o}{\mu A} + \frac{2t_o}{\mu_0 A} \qquad (9)$$

$$t_i = \frac{\mu_0}{\mu}(l_o - l_i) + t_o$$

Alternatively, when the magnetic resistance is expressed by the relative magnetic permeability, the following Equation (10) is obtained.

$$t_i = \frac{l_o - l_i}{\mu_r} + t_o. \qquad (10)$$

As described above, the lengths $t_o$ and $t_i$ of the outer gaps 26 and 28 and the inner gap 27 at which the effects of the magnetic coupling are the greatest, in other words, the lengths $t_o$ and $t_i$ of the outer gaps 26 and 28 and the inner gap 27 at which efficiency during the three-phase operation is the highest can be relatively expressed by using a difference between the magnetic path lengths $l_o$ and $l_i$ in the core 20 and the relative magnetic permeability, respectively. The length $t_i$ of the inner gap 27 is necessarily larger than the lengths to of the outer gaps 26 and 28.

Figure 7:
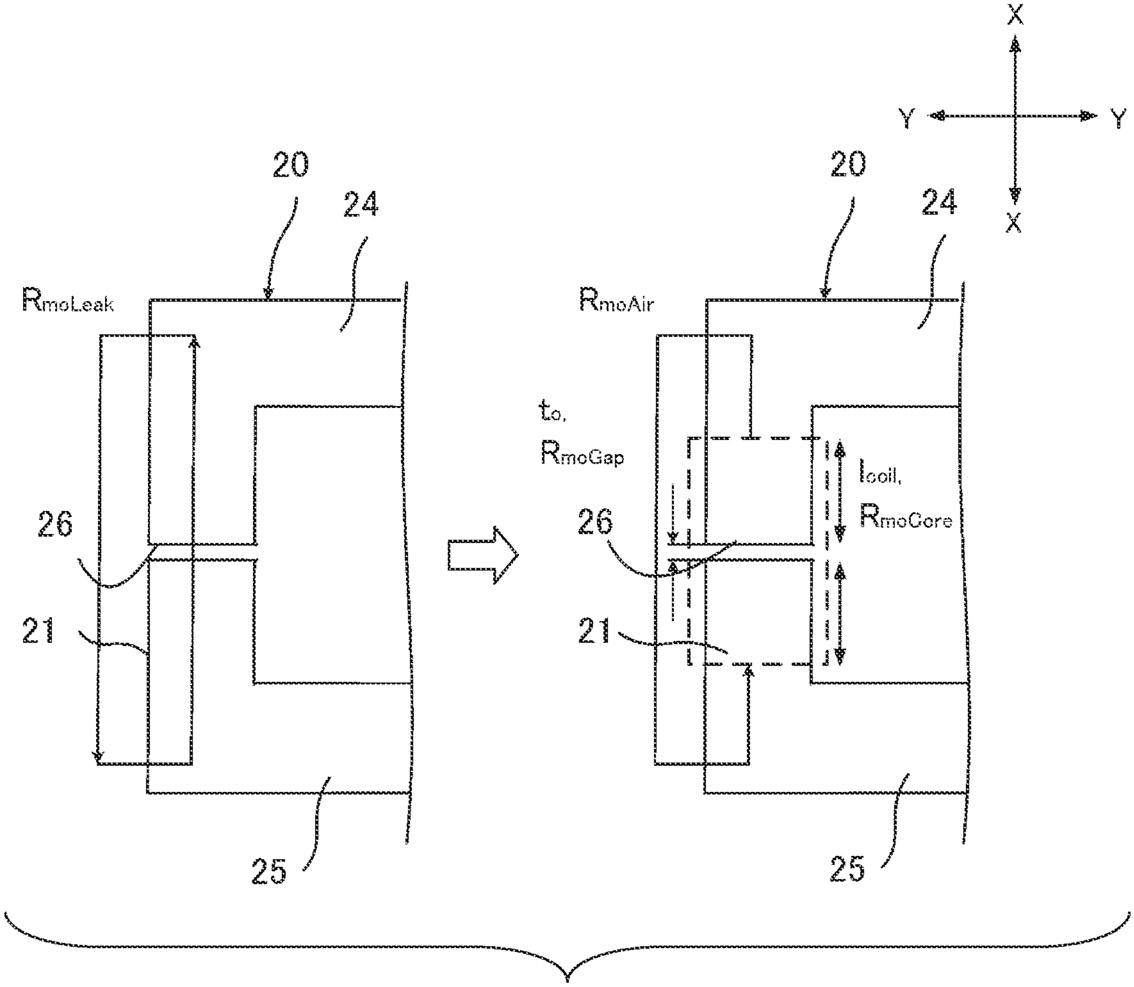
FIG. 7 is a diagram illustrating a leaked magnetic flux of a core 20.
Figure 8:
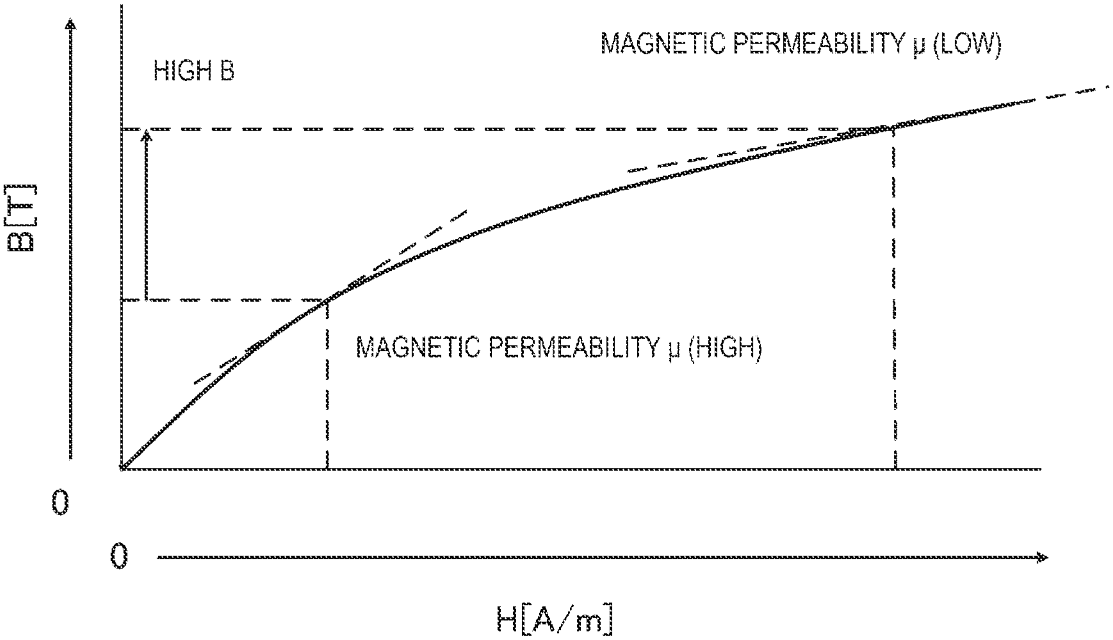
FIG. 8 is a diagram illustrating a relationship between a magnetic flux density B, a magnetic field strength H, and magnetic permeability μ.
Figure 9:
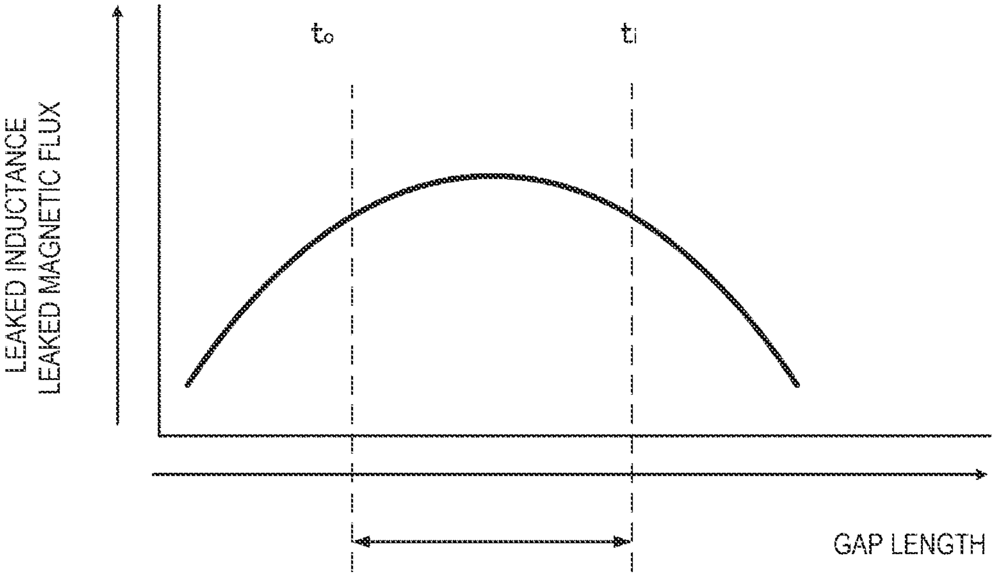
FIG. 9 is a diagram illustrating a relationship between lengths $t_o$, $t_i$ of the gaps 26 to 28 and inductance.

Next, a method for setting optimum values of the lengths $t_o$ and $t_i$ of the outer gaps 26 and 28 and the inner gap 27 will be described. FIG. 7 is a diagram illustrating leaked magnetic flux of the core 20. FIG. 8 is a diagram illustrating a relationship between a magnetic flux density B, a magnetic field strength H, and the magnetic permeability μ. FIG. 9 is a diagram illustrating a relationship between the lengths $t_o$ and $t_i$ of the gaps 26 to 28 and the inductance.

Parameters of parts of the first outer core portion 21 are defined as follows.

A magnetic resistance of a magnetic path of the leaked magnetic flux: $R_{moLeak}$ A magnetic resistance of an air portion: $R_{moAir}$ A magnetic resistance in the outer core portion 21 at a portion where there is the coil 11: $R_{moCore}$ A magnetic resistance of the outer gap 26: $R_{moGap}$ A core length of a portion where there is the coil 11: $l_{coil}$ At this time, $R_{moLeak}=R_{moAir}+R_{moCore}+R_{moGap}$. A leaked magnetic flux of the first outer core portion 21 is expressed by the following Equation (11).

$$\Phi_{moLeak} = \frac{NI}{R_{moLeak}} = \frac{NI}{R_{moAir}+R_{moCore}+R_{moGap}} = \frac{NI}{R_{moAir}+\frac{l_{coil}}{\mu A}+\frac{t_o}{\mu_0 A}} \tag{11}$$

Inductance due to the leaked magnetic flux can be expressed by the following Equation (12).

$$L_{moLeak} = \frac{N^2}{R_{moLeak}} = \frac{N^2}{R_{moAir}+R_{moCore}+R_{moGap}} = \frac{N^2}{R_{moAir}+\frac{l_{coil}}{\mu A}+\frac{t_o}{\mu_0 A}} \tag{12}$$

At this time, parameters which change according to design of the outer gap 26 are the relative magnetic permeability μ and the length $t_o$ of the outer gap 26. Further, as illustrated in FIG. 8, since the relative magnetic permeability μ is along a BH curve, the relative magnetic permeability μ depends on the length t o of the outer gap 26. As a relationship between the length t o of the outer gap 26 and the inductance, a curve is drawn on which the length t o of the outer gap 26 at which the inductance is the largest exists, and the inductance decreases regardless of whether the relative magnetic permeability μ is larger or smaller than the length t o (see FIG. 9).

The same can be said for the other outer gap 28 and the inner gap 27, but in order to cancel the direct-current magnetic flux in the core 20, when maintaining a relative relationship between the lengths t o of the outer gaps 26 and 28 and the length $t_i$ of the inner gap 27 (see Equation (10)), it is impossible to simultaneously set both the gap lengths $t_o$ and $t_i$ such that the inductance is the largest. Therefore, as illustrated in FIG. 9, it is desirable to intentionally shift both the gap lengths $t_o$ and $t_i$ from a maximum point of the inductance, and perform design at an optimum point where the inductance can be balanced between the phases.

Figure 10:
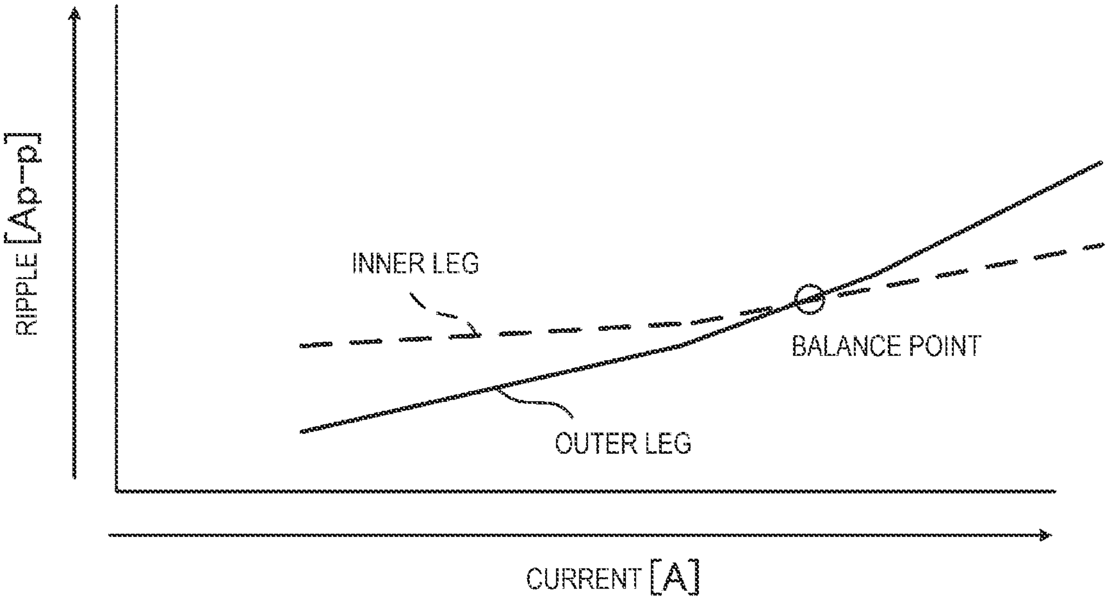
FIG. 10 is a diagram illustrating current dependence of a ripple during a three-phase operation.
Figure 11:
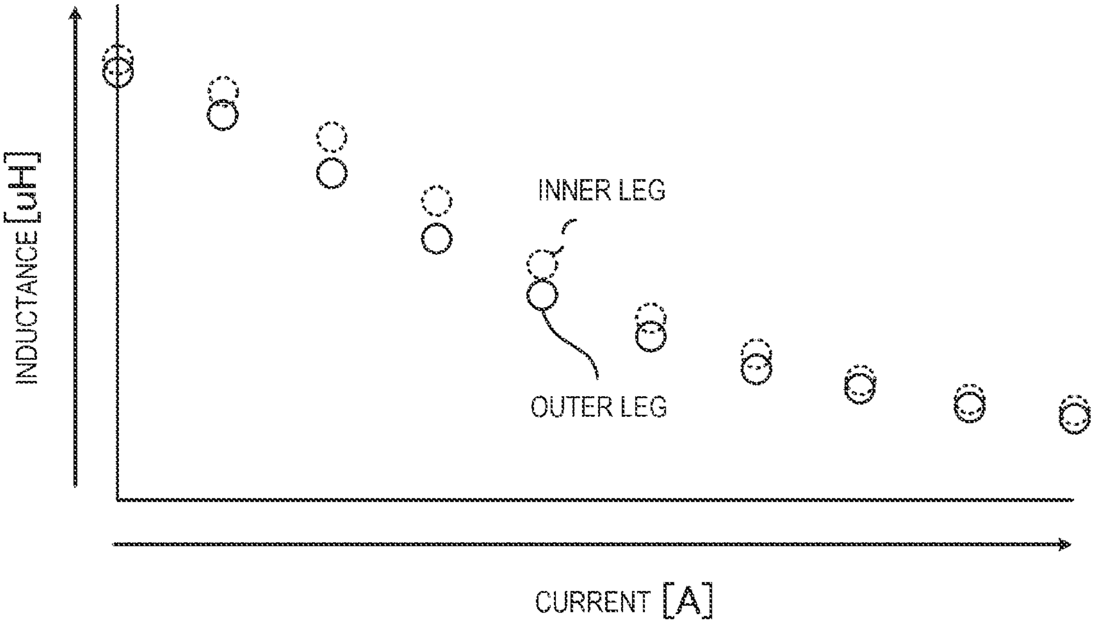
FIG. 11 is a diagram illustrating a relationship between a current of coils 11 to 13 and the inductance.

FIG. 10 is a diagram illustrating current dependence of a ripple during the three-phase operation. FIG. 11 is a diagram illustrating a relationship between a current of the coils 11 to 13 and the inductance.

In the above description, it is assumed that the magnetic permeability μ of the core 20 is constant regardless of a location. However, when considering the leaked magnetic flux, during design in which the magnetic flux in the core 20 is balanced at a certain current value, a change amount of the magnetic permeability μ from a balance point is different at other current values, and therefore the direct-current magnetic flux is not balanced between the phases, and a difference occurs in inductance of each phase. For example, when the inductance is balanced at a certain current value $I_0$, the following Equations (13) and (14) are established based on cancellation conditions of the magnetic flux in the core.

$$\frac{l_{coil}}{\mu_{out}|_{I_0}A}+\frac{t_{out}}{\mu_0 A}=\frac{l_{coil}}{\mu_{in}|_{I_0}A}+\frac{t_{in}}{\mu_0 A} \tag{13}$$

$$\frac{1}{\mu_{out}|_{I_0}}-\frac{1}{\mu_{in}|_{I_0}}=-\frac{1}{\mu_0 l_{coil}}(t_{out}-t_{in}).$$

$$\frac{1}{\mu_{out}|_{I_0}}-\frac{1}{\mu_{in}|_{I_0}}>0 \tag{14}$$

$$\mu_{in}|_{I_0}>\mu_{out}|_{I_0}$$

In the core 20, the inner gap 27 is longer than the outer gaps 26 and 28. Therefore, the magnetic permeability μ of the core 20 when the magnetic flux of the magnetic path in the core 20 can be canceled is larger in the inner core portion 22 than in the outer core portions 21 and 23. That is, the inner core portion 22 is used in a low magnetic flux region, and the outer core portions 21 and 23 are used in a high magnetic flux region. As illustrated in FIG. 10, during the three-phase operation, in terms of characteristics of the BH curve, when shift is performed from a balanced balance point to a low current side, the outer core portions 21 and 23 used at the high magnetic flux have a larger change in the magnetic permeability μ. Accordingly, at the outer core portions 21 and 23 (outer coils 11 and 13), current dependence of the inductance is larger than that of the inner core portion 22 (inner coil 12), and an inductance value is large at a low current value. Therefore, the ripple is relatively small.

(One-Phase Operation)

On the other hand, during the one-phase operation, when the inner coil 12 is selected, due to differences in the lengths $t_o$ and $t_i$ of the gaps 26 to 28, the direct-current magnetic flux is limited and is not easily saturated. Therefore, even if the current is increased, the inductance can be increased. That is, when design is performed according to a design constraint during the three-phase operation, as illustrated in FIG. 11, under low current conditions during the one-phase operation, the inductance is larger in the inner coil 12 than in the outer coils 11 and 13. Therefore, in order to reduce the ripple during the one-phase operation, it is desirable to select and operate the inner coil 12.

Although various embodiments have been described above with reference to the drawings, it is needless to say that the present disclosure is not limited to these examples. It is apparent that those skilled in the art can conceive of various modifications and changes within the scope described in the claims, and it is understood that such modifications and changes naturally fall within the technical scope of the present disclosure. Further, respective constituent elements in the above embodiment may be freely combined without departing from the gist of the disclosure.

In the present specification, at least the following matters are described. Although corresponding constituent elements or the like in the above-described embodiment are shown in parentheses, the present invention is not limited thereto.

(1) A control device (the control device CTR) for a power conversion device (the DC-DC converter 10) which uses a three-phase magnetic coupling reactor (the three-phase magnetic coupling reactor 1), in which:

the three-phase magnetic coupling reactor includes:

a first outer coil (the first outer coil 11);

a second outer coil (the second outer coil 13);

an inner coil (the inner coil 12) disposed between the first outer coil and the second outer coil; and a core (the core 20) including a first outer core portion (the first outer core portion 21) around which the first outer coil is wound, a second outer core portion (the second outer core portion 23) around which the second outer coil is wound, and an inner core portion (the inner core portion 22) around which the inner coil is wound;

the first outer core portion, the second outer core portion, and the inner core portion extend in a first direction (the X-axis direction), and are disposed side by side in a second direction (the Y-axis direction) orthogonal to the first direction;

one end sides of the first outer core portion, the second outer core portion, and the inner core portion in the first direction are coupled by a first coupling portion (the first coupling portion 24) which extends in the second direction;

an other end sides of the first outer core portion, the second outer core portion, and the inner core portion in the first direction are coupled by a second coupling portion (the second coupling portion 25) which extends in the second direction;

magnetic fluxes which pass through the first outer core portion, the second outer core portion, and the inner core portion are configured such that a direction of a direct-current magnetic flux derived from a coil wound around any core portion and generated in the core portion and a direction of a direct-current magnetic flux derived from another coil wound around another core portion and generated in the core portion are opposite to each other;

each of the first outer core portion and the second outer core portion includes an outer gap (the outer gaps 26 and 28) in a center in the first direction;

the inner core portion includes an inner gap (the inner gap 27) having a length in the first direction larger than that of the outer gap in a center in the first direction;

the control device is configured to switch between:

a one-phase operation of causing a current to flow through any one of the first outer coil, the second outer coil, and the inner coil to operate;

a two-phase operation of causing a current to flow through any two of the first outer coil, the second outer coil, and the inner coil to operate; and a three-phase operation of causing a current to flow through all of the first outer coil, the second outer coil, and the inner coil to operate; and the control device selects the inner coil in the one-phase operation.

According to (1), each of the first outer core portion and the second outer core portion includes the outer gap in the center in the first direction, and the inner core portion includes the inner gap having the length in the first direction larger than that of the outer gap in the center in the first direction. Therefore, a three-phase inductance can be balanced such that a ripple current during the three-phase operation is reduced. Further, inductance of the inner coil is larger than that of the outer coil because of a difference in the length of the gap. Therefore, a ripple current and loss during the one-phase operation can be reduced by selecting the inner coil during the one-phase operation.

(2) The control device for the power conversion device according to (1) in which the control device selects the first outer coil and the second outer coil in the two-phase operation.

According to (2), the first outer coil and the second outer coil are selected in the two-phase operation, and the inner coil is selected in the one-phase operation. Therefore, a difference in use frequency can be prevented to equalize loads of the coils or the like.

What is claimed is:

1. A control device for a power conversion device which uses a three-phase magnetic coupling reactor, wherein:

the three-phase magnetic coupling reactor includes:

a first outer coil;

a second outer coil;

an inner coil disposed between the first outer coil and the second outer coil; and a core including a first outer core portion around which the first outer coil is wound, a second outer core portion around which the second outer coil is wound, and an inner core portion around which the inner coil is wound;

the first outer core portion, the second outer core portion, and the inner core portion extend in a first direction, and are disposed side by side in a second direction orthogonal to the first direction;

one end sides of the first outer core portion, the second outer core portion, and the inner core portion in the first direction are coupled by a first coupling portion which extends in the second direction;

an other end sides of the first outer core portion, the second outer core portion, and the inner core portion in the first direction are coupled by a second coupling portion which extends in the second direction;

magnetic fluxes which pass through the first outer core portion, the second outer core portion, and the inner core portion are configured such that a direction of a direct-current magnetic flux derived from a coil wound around any core portion and generated in the core portion and a direction of a direct-current magnetic flux derived from another coil wound around another core portion and generated in the core portion are opposite to each other;

each of the first outer core portion and the second outer core portion includes an outer gap in a center in the first direction;

the inner core portion includes an inner gap having a length in the first direction larger than that of the outer gap in a center in the first direction;

the control device is configured to switch between:

a one-phase operation of causing a current to flow through any one of the first outer coil, the second outer coil, and the inner coil to operate;

a two-phase operation of causing a current to flow through any two of the first outer coil, the second outer coil, and the inner coil to operate; and a three-phase operation of causing a current to flow through all of the first outer coil, the second outer coil, and the inner coil to operate; and the control device selects the inner coil in the one-phase operation.

2. The control device for the power conversion device according to claim 1, wherein the control device selects the first outer coil and the second outer coil in the two-phase operation.

* * * * *